United States Patent [19]

Tamez et al.

[11] Patent Number: 5,894,344
[45] Date of Patent: Apr. 13, 1999

[54] ELEVATION MEASUREMENT APPARATUS

[75] Inventors: Daniel Tamez; Ana Tamez, both of Rio Grande City, Tex.

[73] Assignee: Tamez Construction, Rio Grande City, Tex.

[21] Appl. No.: 08/838,414

[22] Filed: Apr. 7, 1997

[51] Int. Cl.⁶ .......................... G01C 03/08; G01C 15/06
[52] U.S. Cl. .............................. 356/4.08; 33/292; 33/294
[58] Field of Search ................... 356/4.08, 11; 33/292, 33/293, 294, 295, 290

[56] References Cited

U.S. PATENT DOCUMENTS 2,896,327  7/1959  Thomann ........................... 33/293
3,460,260  8/1969  Sarlandt ............................. 33/73
5,087,125  2/1992  Narutaki ........................... 356/375

*Primary Examiner*—Mark Hellner
*Attorney, Agent, or Firm*—Arnold, White & Durkee

[57] ABSTRACT

An elevation measurement instrument including a support ruler, an optical instrument and a bracket pivotally coupling the optical instrument to the support ruler. The optical instrument includes a first ocular mount having a telescope with a horizontal crosshair and a second ocular mount having a horizontal alignment level device. The bracket couples the optical instrument to the ruler along a horizontally balanced axis. The bracket includes a position indicator colinearly aligned with the horizontal crosshair.

10 Claims, 6 Drawing Sheets

1

ELEVATION MEASUREMENT APPARATUS

BACKGROUND OF THE INVENTION

In the field of construction, it is often necessary to ascertain the elevation of a site or of a feature of a building, bridge or any other structure being constructed. When designing a construction project, engineers and architects prepare blueprints indicating the relative elevation of various features, including the elevation of the sub grade, that is, the surface of earth or rock leveled-off to receive a foundation. Accurate elevation measurements are critical to ensure the proper completion of a project.

A common instrument used to measure elevations comprises a single telescopic lens mounted on a tripod base. To measure elevations, the instrument is first placed on a fixed and unalterable position somewhere in the construction site. By adjusting each of the tripod legs, the instrument is calibrated to assure that it is perfectly level with a horizontal plane. One operator then places a reference ruler having spaced measurement marks on top of a reference point of known elevation. The reference ruler may include an adjustable marker. A second operator points the telescope at the measurement ruler and notes or marks the measurement of the ruler, determining the elevation of the horizontal plane of sight of the telescope. Once this horizontal plane of sight is determined, the instrument is swiveled to intersect a vertical axis aligned at a second location of unknown elevation. By having the first operator place the measurement ruler at this second location, the second operator can then note the ruler's measurement and calculate the elevation difference of the second location with respect to the reference point.

Two operators are necessary to operate the tripod telescope instrument, one to operate the tripod-mounted telescope and one to move the measurement ruler along the construction site. If at any time the adjustment on the tripod-mounted telescope is disturbed, either in its alignment to the horizontal plane or on its elevation, an error will occur that will be transferred to all other points in the construction site. Furthermore, the ability of the tripod telescope to measure height differences is limited to the ability to position the ruler within the line of sight of the instrument. Points having heights that differ more than a length of the measurement ruler or are hidden from the line of sight cannot be measured directly.

Other known methods and apparatus for measuring elevations include the use of a laser to triangulate the desired elevation of the site. However, the laser equipment is generally more costly than the traditional telescope. Laser equipment is fragile and complex and may prove to be too expensive for smaller operations. A need remains for a cost-effective apparatus and method for measuring elevations. The desired apparatus would preferably minimize measurement error and allow use by a single operator.

SUMMARY OF THE INVENTION

The present invention provides a new method and instrument to obtain elevation measurements requiring only a single operator. The elevation measurement instrument of the present invention includes a longitudinal support ruler and an optical instrument coupled to the longitudinal support ruler. The optical instrument is coupled to the support ruler along a horizontal equilibrium point or axis, such that the instrument has a tendency to rotate to a generally horizontal alignment regardless of the alignment of the support ruler. The relative height of the optical instrument is adjustable.

The optical instrument includes a position indicator to indicate the position of the optical instrument relative to the end of the support ruler, that is, the relative height of the optical instrument. The instrument also includes a first ocular mount having a telescope. The lens of the telescope include a horizontal crosshair which is colinearly aligned with the position indicator.

To measure the elevation of a point on a site, the original instrument is placed in vertical alignment on top of a point of unknown elevation. A reference ruler is placed vertically aligned on top of a reference point of known elevation. The optical instrument is aligned with the horizontal plane and aimed at the reference ruler. The operator views the reference ruler through the telescope and notes the measurement of the reference ruler indicated by the crosshair. After noting the relative height measurement indicated by the position indicator, the operator can then calculate the elevation of the site using the known elevation, the relative height measurement and the reference ruler measurement.

The procedure also can be performed by reversing the placement of the reference ruler and the measurement instrument.

DETAILED DESCRIPTION OF THE INVENTION

Figure 1:
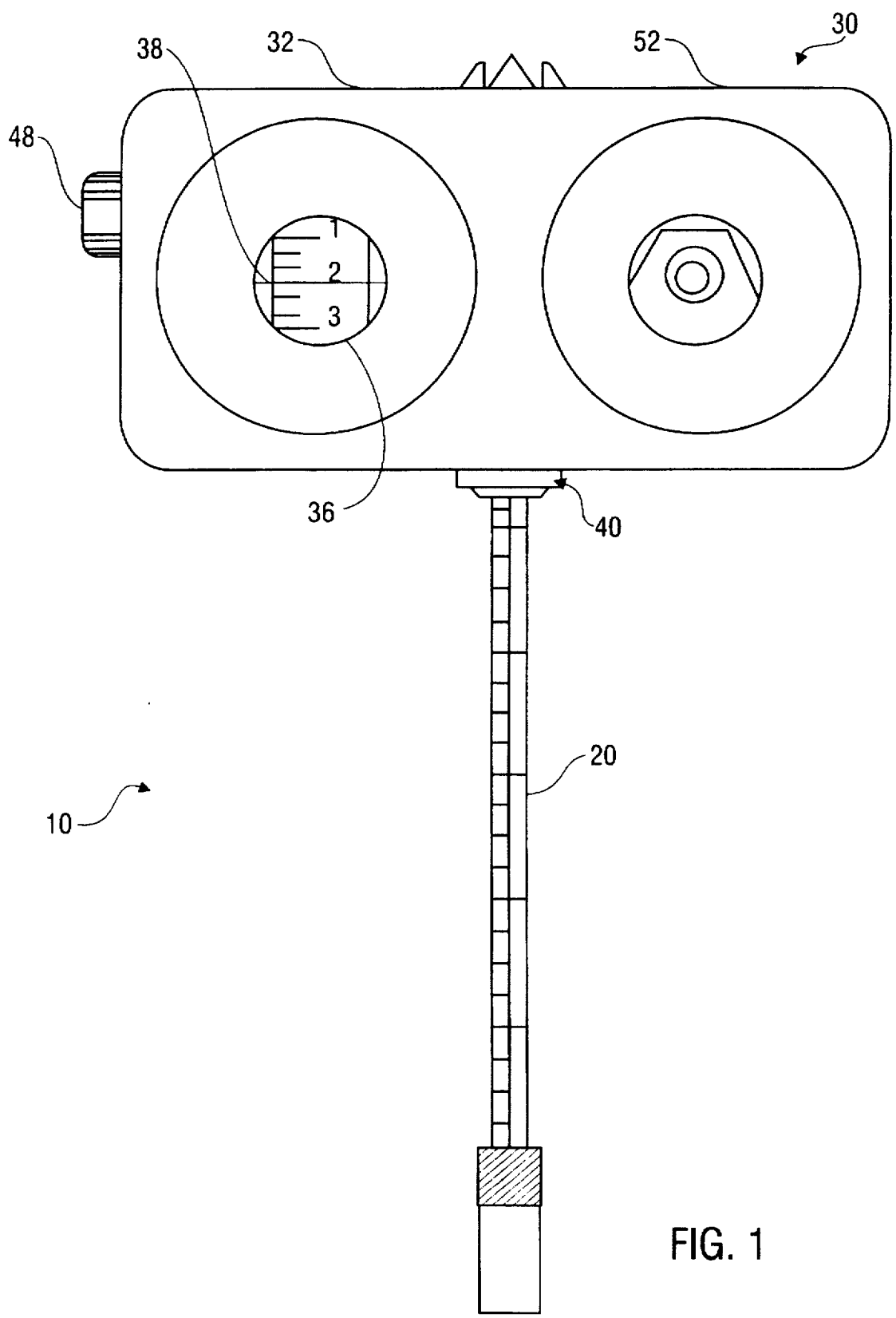
FIG. 1 is a front elevation view of an elevation measurement instrument in accordance with the present invention aimed at a measurement ruler.
Figure 2:
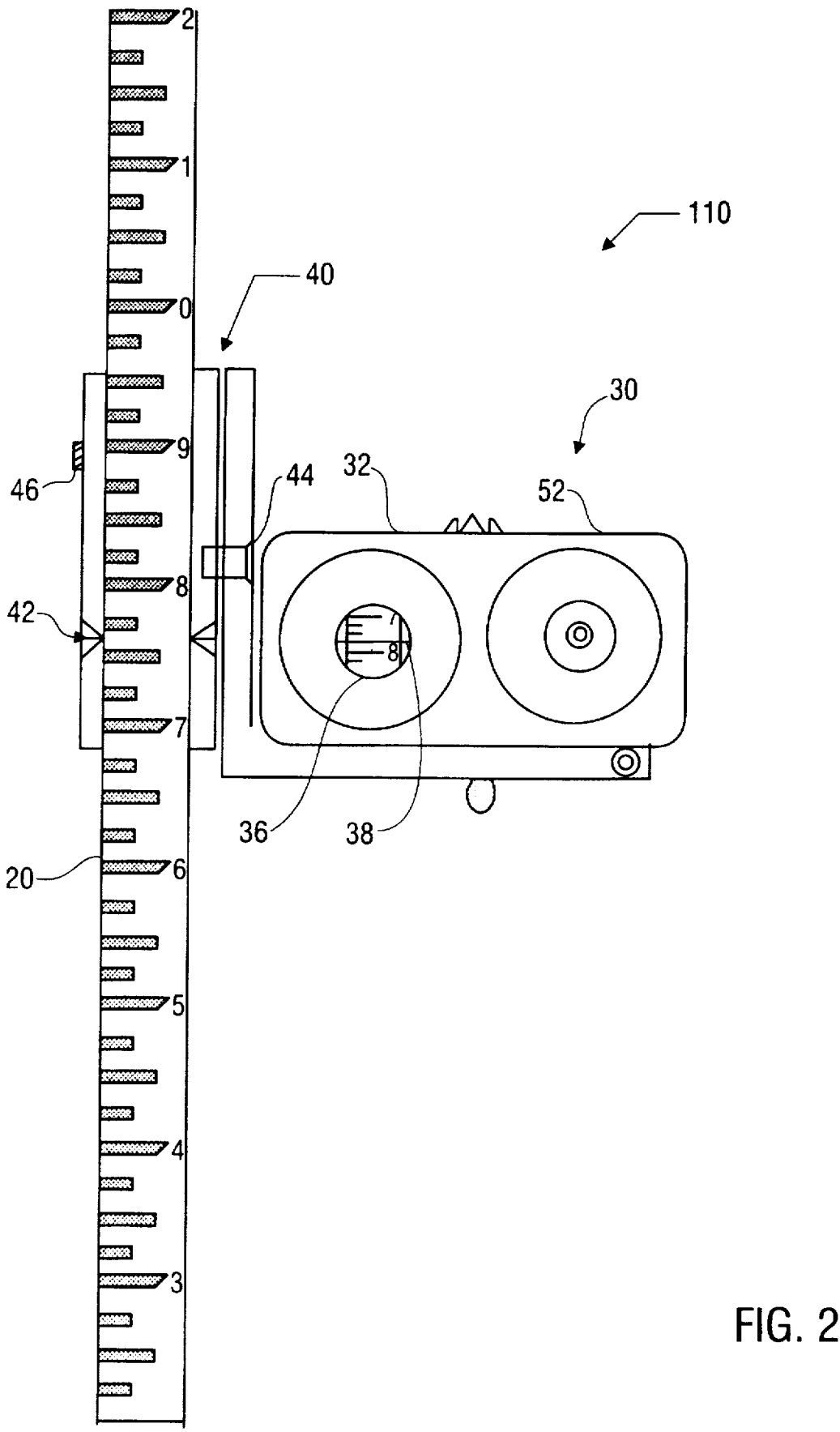
FIG. 2 is a back elevation view of a second embodiment of an elevation measurement instrument in accordance with the present invention.
Figure 3:
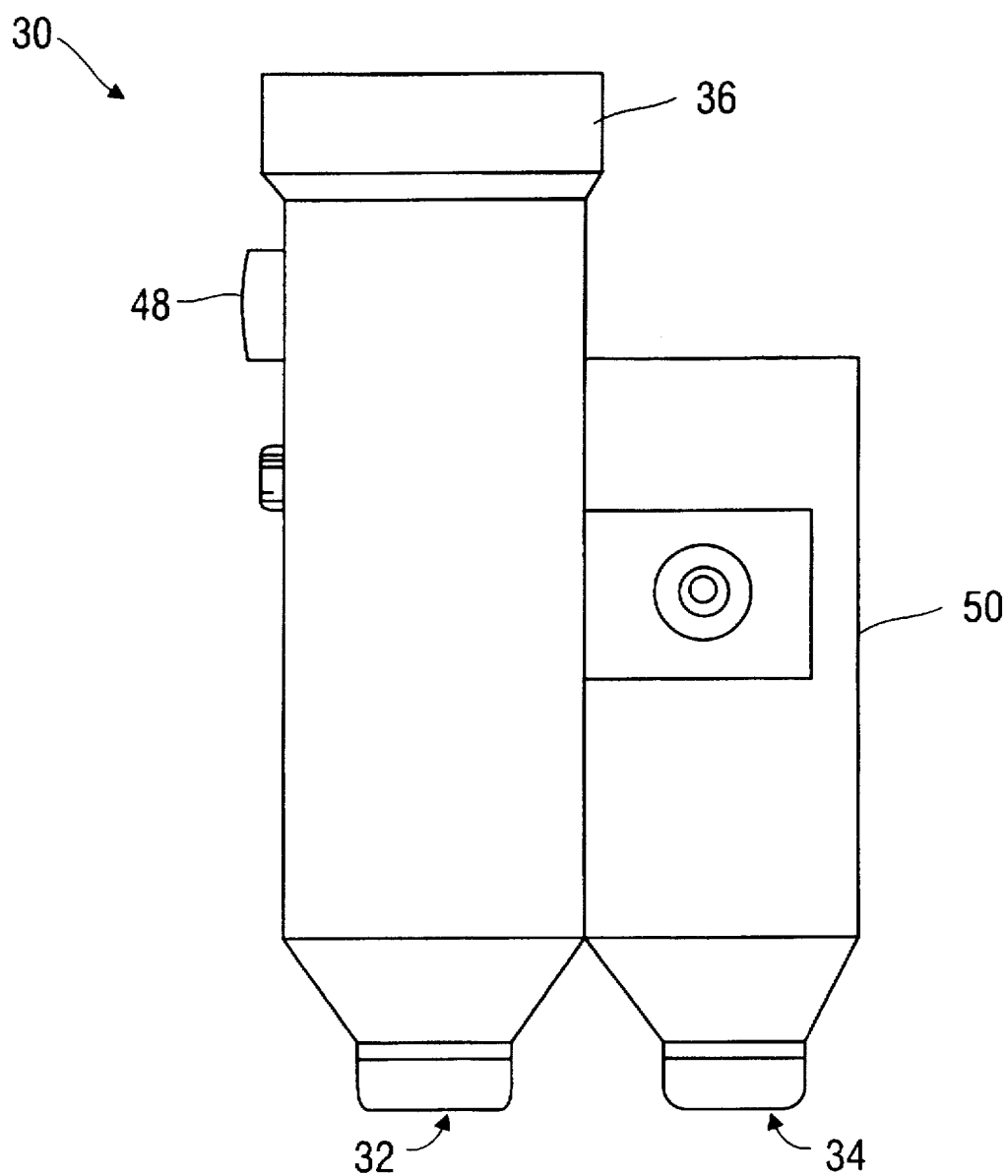
FIG. 3 is a top plane view of the measuring instrument illustrated in FIG. 1.

FIG. 1 illustrates a first embodiment of an elevation measurement apparatus 10 in accordance with the present invention. FIG. 2 illustrates a second embodiment of a similar elevation measurement apparatus 110 in accordance with the present invention. Both embodiments have similar elements which are referenced by the same reference numbers. Referring to FIGS. 1–3, the elevation measurement apparatus 10 includes a support ruler 20 and an optical instrument 30. The optical instrument 30 is a binocular optical instrument having a first ocular mount 32 and a second ocular mount 52. Placed on the first ocular mount 32 is a telescope 34 (seen in FIG. 3) having a viewing aperture 36 having a horizontal crosshair 38. The term "telescope" is intended to encompass any instrument for viewing distant objects. The optical instrument 30 is adjustably mounted to the support ruler 20 by a bracket 40. The support ruler of the elevation measurement apparatus 10 illustrated in FIG. 1 is mounted generally along the center of the optical instrument 30, while the support ruler of apparatus 110 illustrated in FIG. 2 is mounted to the side of the optical instrument.

The support ruler 20 in the present embodiment is a generally cylindrical metal rod including imprinted graduated unit measurements. In alternative embodiments, the support ruler 20 can be made out of wood, plastic, or other suitable materials. The support ruler 20 can include one or more extending telescopic elements to allow adjustments as to the length of the ruler.

The bracket 40 is coupled to the optical instrument 30. The bracket 40 includes a position indicator 42 which is in linear alignment with the horizontal line in the crosshair 38. The optical instrument 30 has a horizontal center of gravity, that is, a horizontally balanced point or axis. The instrument 30 is hingedly or pivotally connected to the support ruler 20 along this horizontally balanced point or axis, thus causing the optical instrument 30 to rotate naturally to a position in alignment with the horizontal plane. A horizontal adjustment screw 44 can be used to lock the bracket 40 and the optical instrument 30 at a desired alignment with respect to the ruler support 20.

In the apparatus 10, the bracket 40 is slidably coupled to the support ruler 20. The position of the optical instrument 30 can be adjusted by sliding the bracket 40 along the support ruler 20. The bracket 40 can be secured at a desirable position by tightening a vertical position locking screw 46. In alternative embodiments, the optical instrument can be coupled to a fixed position on a support ruler. The ruler can include telescoping or sliding segments which allow the operator to change the length of the ruler and, accordingly, the relative height of the optical instrument (the distance between the optical instrument and a bottom end of the support ruler).

Figure 4:
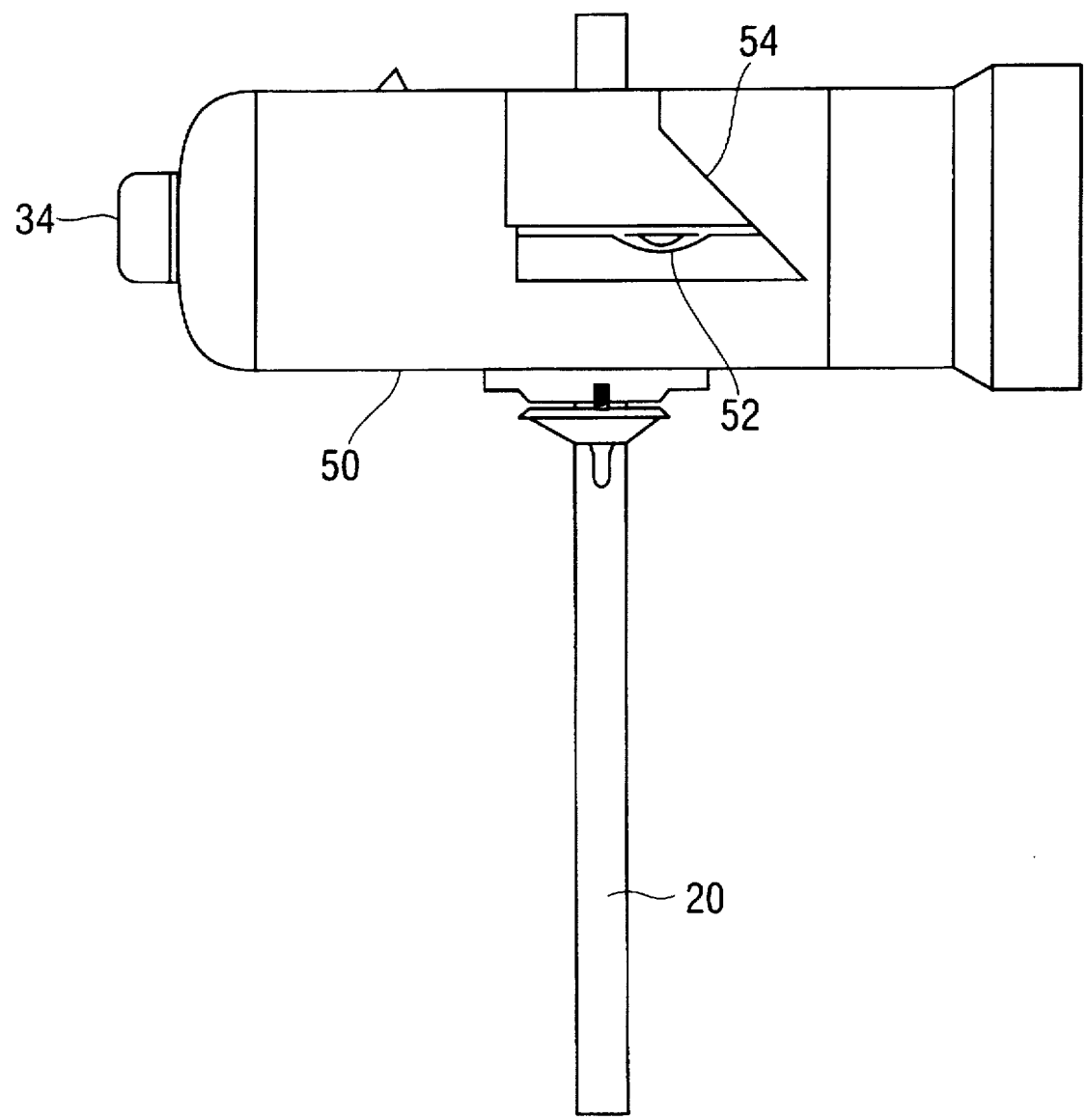
FIG. 4 is a side elevation cross-sectional view of the measuring instrument illustrated in FIG. 1 coupled to the support ruler.

The telescope 34, better seen in FIG. 3, is a tubular magnifying optical instrument having a viewing aperture 36. A focus knob 48 can be included to help adjust the focus of telescope 34. A cylindrical body 50 is coupled to the second ocular mount 52. As illustrated in FIG. 4, a level device 54 that indicates adjustment with respect to the horizontal plane is located inside the second cylindrical body 50. A slanted mirror 56 reflects the reading of the level device 54 to make it visible through a viewing aperture 58 on the second cylindrical body 50. In the embodiment shown, the level device 54 comprises a slightly bowed glass tube having a bubble placed in a liquid. Other level devices known in the art can be used.

Figure 5:
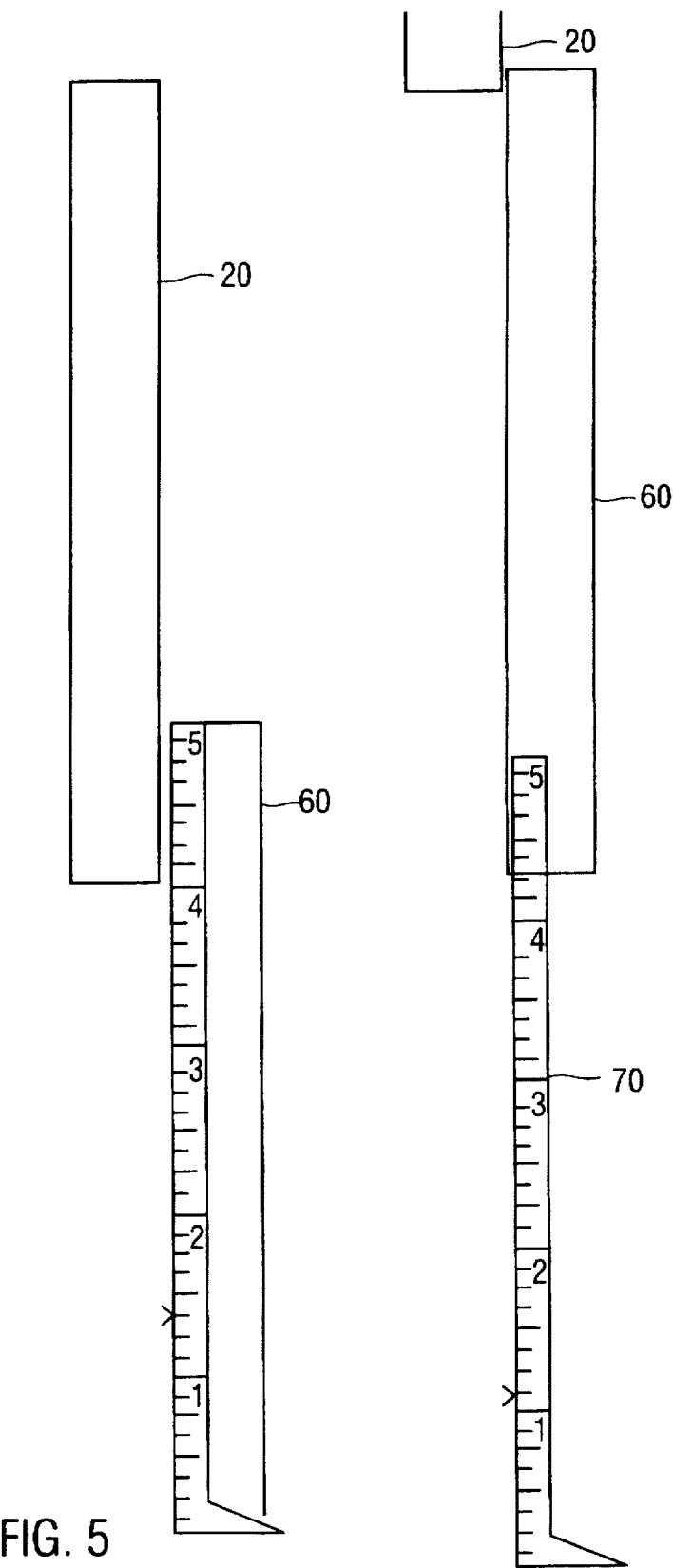
FIG. 5 is a detailed side elevation view of a lower end of a support ruler in accordance with the present invention.

FIG. 5 shows a bottom section of the ruler 20. The ruler 20 includes a first subgrade elevation ruler 60 adjustably and slidably coupled to a bottom portion of the ruler 20. The subgrade elevation ruler 60 includes a second subgrade elevation ruler 70 adjustably and slidably coupled to a bottom portion of the first elevation ruler 60. The elevation rulers 60 and 70 allow the operator to increase the relative height at which the optical instrument 30 is positioned, by increasing the distance between the optical instrument 30 and the end of the support ruler structure. During use, the elevation rulers are adjusted to compensate between the elevation of the subgrade and the expected elevation (e.g., thickness) of the slab and/or the flooring. In this way, the operator can take or follow blueprint measurements referenced with respect to the expected floor height.

Figure 6:
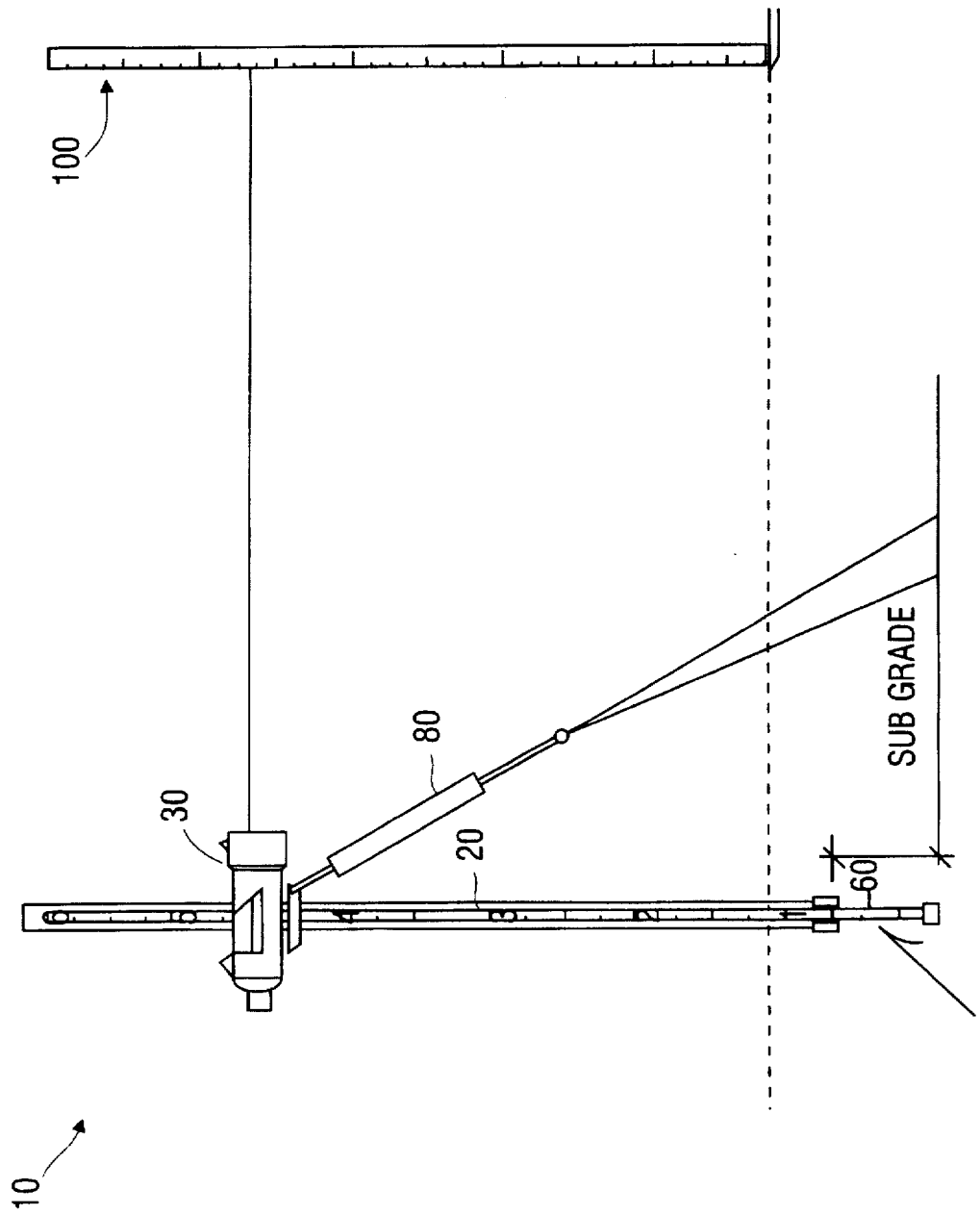
FIG. 6 is a side elevation view depicting the elevation measurement instrument illustrated in FIG. 1 during use.

FIG. 6 is an elevation view of the elevation measurement apparatus 10 in operation. An optional brace 80 comprising an extendable rod that can be extended diagonally to the ground is coupled to the bracket 40 or the optical instrument 30 to provide additional stability.

A reference ruler 100 is used in conjunction with the elevation instrument 10. The reference ruler 100 is a linking ruler comprising a longitudinally extending cylindrical tube measuring approximately twenty feet and including graduated foot and inches marks. Other rulers of different materials, lengths and/or including different unit indications also can be used.

The first steps when measuring an elevation using the apparatus of the present invention is to place the reference ruler 100 vertically aligned on top of the point of known elevation. The elevation measurement instrument is placed on the point of the unknown elevation. The support ruler 20 is aligned to a vertical axis. Elevation rulers 60 and 70 can be extended to compensate for the expected thickness of the flooring and/or base slab. Once the rulers are positioned, the operator aligns the optical instrument with the horizontal plane by observing the adjustments necessary in the leveling device 52. The relative height of the optical instrument 30 can be adjusted by sliding the instrument up or down the support ruler 20. Once horizontal alignment is achieved, the operator can lock the position of the optical instrument 30 using the horizontal alignment screw lock 44. Likewise, once the operator has placed the optical instrument at the desired relative height, the operator can lock the optical instrument 30 by using the vertical position lock screw 46.

Once the desired horizontal and relative height positions are achieved, the telescope 34 of the optical instrument 30 is aimed at the reference ruler 100. By looking through viewing aperture 36, the operator then notes the measurement on the reference ruler 100 indicated by the horizontal crosshair 38 on the telescope 34.

The operator then notes the measurement of the support ruler 20 indicated by the position indicator 42. Using the known elevation, the support ruler measurement and the reference ruler measurement the operator calculates the elevation of the unknown site. For example, if the reference ruler is positioned on a point having a known elevation of ten feet and the support ruler measurement reads five feet while the reference ruler measurement reads nine feet, the operator can add the measurements from the known site (10' plus 9') and subtract the measurement obtained from the point of the site of unknown elevation (5') to determine the elevation at the base of the elevation measurement apparatus (19' minus 5' equals 14').

Alternatively, the location of the instrument and the reference ruler can be reversed during measurement. That is, the elevation measurement instrument can be placed on the point of known elevation, while the reference ruler is placed on the point of unknown elevation. This alternative can be useful especially when the site of unknown elevation appears to be at a significantly lower elevation than the point of known elevation.

As mentioned above, extension rulers 60 and 70 can be used to account for the thickness of a base slab or floor. For example, if the slab to be placed over the sub grade has a expected thickness of twelve inches, the extension ruler 60 can be extended twelve inches. This adjustment allows the operator to make measurements from the expected location of the floor surface, having already accounted for the expected thickness of the slab.

The instrument of the method of the present invention allows for a single operator to make elevation measurements. Moreover, the apparatus and the method of the present invention do not require a perfectly immobile and fixed measurement instrument. Each measurement is independent from other measurements and thus not prone to repeated error propagation.

Many modifications and variations may be made in the techniques and structures illustrated herein without departing from the spirit and scope of the present invention. Accordingly, it should be understood that the methods and apparatus described herein are illustrative only and are not limiting in the scope of the present invention.

What is claimed is:

1. An elevation measurement instrument comprising:
a longitudinal support ruler;
an optical instrument including a first ocular mount and a second ocular mount, the first ocular mount including a telescope having a viewing aperture including a horizontal crosshair, the second ocular mount including a level device having a horizontal adjustment indicator and a second viewing aperture, the indicator of the level device being visible through the second viewing aperture; and
a bracket adjustably coupling the optical instrument to the longitudinal support ruler, the bracket including a position indicator colinearly aligned with the crosshair of the telescope.

2. The elevation measurement instrument of claim 1, wherein the optical instrument has a horizontal center of gravity and is hingedly coupled to the support ruler along said horizontal center of gravity, such that the optical instruments rotates to a generally horizontal alignment regardless of the alignment of the support ruler.

3. The elevation measurement instrument of claim 1, further comprising a subgrade elevation ruler slidably connected to and in linear alignment with a lower end portion of the support ruler.

4. The elevation measurement instrument of claim 1, further comprising a longitudinal brace coupled to the optical instrument to provide additional support to the optical instrument.

5. The elevation measurement instrument of claim 1, further including a slide locking mechanism to lock the optical instrument at a desired position along the length of the longitudinal support ruler and a rotation locking mechanism to lock the optical instrument at a desired angular alignment with respect to the longitudinal support ruler.

6. An elevation measurement instrument comprising:
a longitudinal support ruler having a bottom end;
a binocular optical instrument coupled to the longitudinal support ruler, wherein the optical instrument has a horizontal center of gravity and is hingedly coupled to the support ruler along said horizontal center of gravity, such that the optical instrument rotates to a generally horizontal alignment regardless of the alignment of the support ruler, and where the optical instrument is slidably connected to the support ruler such that the optical instrument can be positioned at varying distances from the bottom end of the support ruler; the optical instrument including a position indicator to indicate the position of the optical instrument along the support ruler, a first ocular mount having a telescope having a horizontal crosshair horizontally aligned with the position indicator, and a second ocular mount having a level showing the degree of horizontal alignment of the optical instrument;
a slide locking mechanism to lock the optical instrument at a desired position along the length of the longitudinal support ruler;
a rotation locking mechanism to lock the optical instrument at a desired angular alignment with respect to the longitudinal support ruler;
a longitudinal brace coupled to the optical instrument to provide additional support to the optical instrument; and
an elevation ruler slidably connected to and in linear alignment with the support ruler.

7. A method for measuring the elevation of a point of unknown elevation using a reference point having a known elevation, the method comprising the steps of:

providing an elevation instrument comprising:
a longitudinal support ruler having a lower end and measurement markings;
an optical instrument having a horizontal center of gravity and being hingedly coupled to the longitudinal support ruler along said horizontal center of gravity, such that the optical instrument rotates to a generally horizontal alignment regardless of the alignment of the longitudinal support ruler;
the optical instrument including a position indicator to indicate the position of the optical instrument in relation to the lower end of the support ruler, and a first ocular mount having a telescope, the telescope including a viewing aperture having a horizontal crosshair colinearly aligned with the position indicator, and a second ocular mount including a level device having a horizontal adjustment indicator and a second viewing aperture, the indicator of the level device being visible through the second viewing aperture;
providing a reference ruler having a lower end and measurement markings;
placing the lower end of one of the rulers vertically aligned on top of each of the points, wherein one ruler is placed on the reference point and one ruler is placed on the point of unknown elevation;
directing the telescope to view the reference ruler;
rotating the optical instrument to a desired angular alignment with respect to the longitudinal support ruler in accordance with the indications of the level device;
noting the reference ruler measurement indicated by the position indicator;and
calculating the elevation of the point of unknown elevation using the known elevation, the support ruler measurement and the reference ruler measurement.

8. The method of claim 7, wherein the optical instrument is adjustably coupled to the support ruler and further comprising the step of adjusting the height of the optical instrument relative to the bottom end of the support ruler.

9. The method of claim 7, wherein the elevation measuring instrument further comprises a subgrade elevation ruler slidably connected to and in linear alignment with a lower portion of the support ruler, the method further comprising the step of extending the subgrade elevation ruler a length generally equal to the expected thickness of a floor slab.

10. A method for measuring the elevation of a point of unknown elevation by reference to a point of known elevation, the method comprising the steps of:

providing an elevation measurement instrument comprising:
a longitudinal support ruler;
a optical instrument having a telescope including a horizontal crosshair and an adjustable connector coupling the optical instrument to the support ruler, the optical instrument having a horizontal axis of equilibrium and being hingedly coupled to the support ruler along said horizontal axis of equilibrium,
a position indicator linearly aligned with the crosshair of the telescope;
providing a reference ruler;
placing the rulers each vertically aligned on one of the points;
directing the optical instrument towards the reference ruler;
placing the optical instrument in horizontal alignment;

viewing the reference ruler through the telescope and noting the measurement indicated by the crosshair of the telescope;

noting the measurement of the support ruler indicated by the position indicator; and calculating the elevation of the site using the known elevation, the support ruler measurement and the reference ruler measurement.

* * * * *